(12) United States Patent
Yang et al.

(10) Patent No.: US 12,550,194 B2
(45) Date of Patent: Feb. 10, 2026

(54) SERVICE TRANSMISSION METHOD AND APPARATUS

(71) Applicant: HUAWEI TECHNOLOGIES CO., LTD., Guangdong (CN)

(72) Inventors: Bo Yang, Moscow (RU); Yunping Lyu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 18/307,322

(22) Filed: Apr. 26, 2023

(65) Prior Publication Data
US 2023/0262773 A1 Aug. 17, 2023

Related U.S. Application Data

(63) Continuation of application No. PCT/CN2021/126891, filed on Oct. 28, 2021.

(30) Foreign Application Priority Data

Oct. 29, 2020 (CN) .......................... 202011176022.5

(51) Int. Cl.
*H04W 74/08* (2024.01)
*H04W 74/0816* (2024.01)

(52) U.S. Cl.
CPC ... *H04W 74/0816* (2013.01); *H04W 74/0875* (2013.01)

(58) Field of Classification Search
CPC ............. H04W 72/56; H04W 74/0816; H04W 74/0875
See application file for complete search history.

(56) References Cited

U.S. PATENT DOCUMENTS 9,204,479 B2 * 12/2015 Kim ...................... H04L 5/0037
10,412,764 B2 * 9/2019 Park ................... H04W 72/0453
10,939,382 B2 * 3/2021 Zhou ..................... H04W 52/44
(Continued)

FOREIGN PATENT DOCUMENTS

CN 102857276 A 1/2013
CN 106817150 A 6/2017

OTHER PUBLICATIONS

Balakrishnam et al., "Service Preemptions for Guaranteed Emergency Medium Access in Wireless Sensor Networks," Military Communications Conference, 2008. MILCOM 2008. IEEE, Piscataway, NJ, USA, Nov. 16, 2008 (Nov. 16, 2008); 7 total pages.
(Continued)

*Primary Examiner* — Liton Miah
(74) *Attorney, Agent, or Firm* — Rimon PC

(57) ABSTRACT

This application provides a service transmission method and an apparatus. Service queues of a first communication apparatus contend for a channel. A service queue obtains the channel through contention to obtain a data transmission opportunity. The first communication apparatus transmits data of a highest-priority service queue of the first communication apparatus in a time window corresponding to the transmission opportunity. According to the technical solutions provided in this application, the data of the highest-priority service queue can be preferably transmitted, to reduce waiting time of the highest-priority service queue to and reduce service latency.

18 Claims, 9 Drawing Sheets

```
┌─────────────────────────────────────────────────────────────┐                S501
│ A service queue of a first communication apparatus obtains a channel through │
│     contention, and the service queue obtains a transmission opportunity     │
└─────────────────────────────────────────────────────────────┘
                                    │
                                    ▼                                          S502
┌─────────────────────────────────────────────────────────────┐
│ The first communication apparatus transmits data of a highest-priority service queue │
│  of the first communication apparatus in a time window corresponding to the  │
│                        transmission opportunity                              │
└─────────────────────────────────────────────────────────────┘
```

(56) References Cited

U.S. PATENT DOCUMENTS

| | | | |
|---|---|---|---|
| 11,109,395 B2* | 8/2021 | Aboul-Magd | H04L 5/18 |
| 2015/0208404 A1* | 7/2015 | Yie | H04W 76/15 |
| | | | 370/329 |
| 2019/0215851 A1* | 7/2019 | Li | H04W 72/1268 |
| 2020/0281008 A1 | 9/2020 | Aboul-Magd et al. | |
| 2020/0367263 A1* | 11/2020 | Cavalcanti | H04W 72/12 |
| 2021/0250125 A1* | 8/2021 | Park | H04L 27/2603 |
| 2021/0320830 A1* | 10/2021 | Park | H04L 27/2603 |
| 2021/0329663 A1* | 10/2021 | Wong | H04W 72/569 |
| 2023/0040899 A1* | 2/2023 | Seok | H04L 5/0094 |
| 2023/0231664 A1* | 7/2023 | Handte | H04L 1/1887 |
| | | | 370/329 |

OTHER PUBLICATIONS

Memon et al., "Multiple preemptive EDCA for emergency medium access control in distributed WLANs," Wireless Networks, vol. 23, No. 5, (2017); Published Online: Mar. 7, 2016; pp. 1523-1534 (12 total pages).

IEEE Computer Society: "IEEE Standard for Local and metropolitan area networks Media Access Control (MAC) Bridge," IEEE Std 802.1D™-2004 (Revision of IEEE Std 802.1D-1998), 3 Park Avenue, New York, NY 10016-5997, USA. Jun. 9, 2004, total 281 pages.

IEEE Computer Society: "IEEE Standard for Information technology—Telecommunications and information exchange between systems—Local and metropolitan area networks—Specific requirements," IEEE Std 802.11e™-2005, IEEE 3 Park Avenue New York, NY 10016-5997, USA, Nov. 11, 2005, total 211 pages.

IEEE Computer Society: "IEEE P802.11be™/D0.1 Draft Standard for Information technology—Telecommunications and information exchange between systems Local and metropolitan area networks—Specific requirements," Sep. 2020, total 299 pages.

* cited by examiner

SERVICE TRANSMISSION METHOD AND APPARATUS

CROSS-REFERENCE TO RELATED APPLICATIONS

This application is a continuation-in-part of International Application No. PCT/CN2021/126891, filed on Oct. 28, 2021, which claims priority to Chinese Patent Application No. 202011176022.5, filed on Oct. 29, 2020. The disclosures of the aforementioned applications are hereby incorporated by reference in their entireties.

TECHNICAL FIELD

This application relates to the field of communication technologies, and in particular, to a service transmission method and an apparatus.

BACKGROUND

EEE 802.11 wireless local area networks, also known as Wi-Fi networks, have become a common solution as the last-hop access technology of the internet. In IEEE 802.11, the most basic data transmission complies with a carrier-sense multiple access with collision avoidance (CSMA/CA) mechanism, which is also referred to as a distributed coordination function (DCF). Because Wi-Fi systems use an unlicensed spectrum, transmission mechanisms of Wi-Fi systems comply with basic CSMA/CA. However, an existing Wi-Fi access transmission mode cannot meet the higher-priority and low-latency service requirements, such as required by AR/VR and industrial control instructions.

SUMMARY

Embodiments of this application provide a service transmission method and an apparatus.

According to a first aspect, an embodiment of this application provides a service transmission method. The method includes: A service queue of a first communication apparatus obtains a channel through contention. The service queue obtains a data transmission opportunity.

The first communication apparatus transmits data of a highest-priority service queue of the first communication apparatus in a time window corresponding to the transmission opportunity.

It should be noted that the first communication apparatus may be an access point (AP) or a terminal (station).

The foregoing embodiment ensures that the data of the highest-priority service queue is transmitted first in the time window corresponding to the transmission opportunity.

Specifically, with reference to the first aspect, in a possible implementation, when a service queue that obtains a channel through contention is a non-highest-priority service queue, if there is to-be-transmitted data in the highest-priority service queue, the data of the highest-priority service queue is preferably transmitted in the time window corresponding to the transmission opportunity; and the non-highest-priority service queue contends for a channel again. In other words, the non-highest-priority service queue gives the transmission opportunity to the highest-priority service queue. If there is no to-be-transmitted data in the highest-priority service queue at this time, data of the non-highest-priority service queue is transmitted in the time window corresponding to the transmission opportunity.

In the foregoing embodiment, when the non-highest-priority service queue obtains a channel through contention to obtain a data transmission opportunity, but there is to-be-transmitted data in the highest-priority service queue, the first communication apparatus preferably transmits the data of the highest-priority service queue, to ensure that data of the higher-priority service queue is transmitted first to reduce service latency.

In another possible implementation, only the highest-priority service queue is allowed to contend for a channel, and a non-highest-priority service queue suspends channel contention.

In the foregoing implementation, the highest-priority service queue has a higher contention success probability in a channel contention process, and this implements first transmission.

According to a second aspect, this application provides a service transmission method. The method includes: in a process in which a first communication apparatus transmits data of a non-highest-priority service queue of the first communication apparatus, if there is to-be-transmitted data in a highest-priority service queue of the first communication apparatus, interrupting the current data transmission of the non-highest-priority service queue, and instead transmitting the data of the highest-priority service queue.

The first communication apparatus may be an access point (AP) or a terminal (station).

In the foregoing embodiment, the first communication apparatus is allowed to interrupt a data transmission process of the non-highest-priority service queue, so that the data of the highest-priority service queue is preferably transmitted, to reduce the waiting time for transmitting the highest-priority service queue thereby reducing service latency.

With reference to the second aspect, in a possible implementation, when the first communication apparatus is in a phase of sending a physical layer protocol data unit PPDU data frame of the non-highest-priority service queue, and there is to-be-transmitted data in the highest-priority service queue, a process of sending the PPDU data frame is interrupted, and a PPDU terminator is added at an interrupted position of the PPDU data frame. The PPDU terminator indicates to end the data transmission process of the non-highest-priority service queue and to transmit the data of the highest-priority service queue.

In the foregoing embodiment, the first communication apparatus is allowed to immediately interrupt a process of sending a data frame of the non-highest-priority service queue, to reduce the waiting time for sending the highest-priority service queue and reduce the service latency, without a need for a peer end to participate in negotiation and scheduling.

With reference to the second aspect, in another possible implementation, when the first communication apparatus is in a phase of sending a PPDU control frame of the non-highest-priority service queue, if there is to-be-transmitted data in the highest-priority service queue, the first communication apparatus adds a PPDU terminator to a tail of the PPDU control frame. The PPDU terminator indicates to end the data transmission process of the non-highest-priority service queue and to transmit the data of the highest-priority service queue after transmission of the PPDU control frame is completed.

In the foregoing embodiment, transmission of the control frame of the non-highest-priority service queue is allowed, to ensure integrity of the data transmission process of the non-highest-priority service queue to some extent. The first communication apparatus is allowed to interrupt a data exchange process of the non-highest-priority service queue, to reduce the waiting time for sending the highest-priority service queue and reduce the service latency.

With reference to the second aspect, in another possible implementation, when the first communication apparatus is in a phase of receiving the data of the non-highest-priority service queue, and the first communication apparatus needs to send a PPDU control frame after receiving the data, if there is to-be-transmitted data in the highest-priority service queue, the first communication apparatus adds a PPDU terminator to a tail of the PPDU control frame. The PPDU terminator indicates to end the data transmission process of the non-highest-priority service queue and to transmit the data of the highest-priority service queue after transmission of the PPDU control frame is completed.

In the foregoing embodiment, complete sending of a control frame of the non-highest-priority service queue is allowed, to ensure integrity of the control frame. The PPDU terminator is used to notify a peer end of occurrence of an interruption, to avoid impact on the peer end. In addition, the data of the highest-priority service queue can be sent in advance before the non-highest-priority service queue ends a complete interaction process, to reduce the service latency.

With reference to the second aspect, in another possible implementation, when the first communication apparatus is in a phase of receiving the data of the non-highest-priority service queue, and the first communication apparatus needs to send a PPDU data frame after receiving the data, if there is to-be-transmitted data in the highest-priority service queue, the first communication apparatus sends a PPDU null frame that includes only a PPDU header and a PPDU terminator. The PPDU null frame indicates to end the data transmission process of the non-highest-priority service queue and to transmit the data of the highest-priority service queue. In other words, after receiving the data, the first communication apparatus stops sending the PPDU data frame that needs to be sent, and instead sends a null frame that includes only the PPDU header and the PPDU terminator, to interrupt the data transmission process of the non-highest-priority service queue.

In the foregoing embodiment, the highest-priority service queue is allowed to preempt sending a data frame of the non-highest-priority service queue so that the data of the highest-priority service queue can be sent in advance before the non-highest-priority service queue ends a complete interaction process, to reduce the service latency.

In the foregoing implementation, the PPDU terminator may be an extremely high throughput-long training field EHT-LTF sequence obtained through 90-degree phase rotation.

According to a third aspect, this application provides a communication apparatus. The communication apparatus has a function of implementing the first communication apparatus in the first aspect or each possible design example of the first aspect, or has a function of implementing the first communication apparatus in the second aspect or each possible design example of the second aspect. The function may be implemented by hardware, or may be implemented by executing corresponding software by hardware. The hardware or software includes one or more modules corresponding to the foregoing function.

In a possible design, the communication apparatus structurally includes a transceiver unit and a processing unit. These units can perform a corresponding function of the first communication apparatus in the first aspect or each possible design example of the first aspect or a corresponding function of the first communication apparatus in the second aspect or each possible design example of the second aspect.

Specifically, in a possible implementation, the transceiver unit is configured to perform communication transmissions, and the processing unit is configured to contend for a channel by a service queue. The service queue obtains the channel through contention to obtain a transmission opportunity.

The processing unit is further configured to control the transceiver unit to transmit data of a highest-priority service queue in a time window corresponding to the transmission opportunity.

In another possible implementation, when a non-highest-priority service queue obtains a channel through contention to obtain a transmission opportunity, if there is to-be-transmitted data in the highest-priority service queue, the transceiver unit transmits the data of the highest-priority service queue in the time window corresponding to the transmission opportunity, and the non-highest-priority service queue contends for a channel again.

In another possible implementation, the processing unit allows only the highest-priority service queue to contend for a channel, and a non-highest-priority service queue suspends channel contention.

In another possible implementation, that the transceiver unit transmits the data of the highest-priority service queue in the time window corresponding to the transmission opportunity includes:

When a non-highest-priority service queue obtains a transmission opportunity and data of the non-highest-priority service queue is transmitted, if there is to-be-transmitted data in the highest-priority service queue, the communication apparatus interrupts data transmission of the non-highest-priority service queue, and the transceiver unit instead transmits the data of the highest-priority service queue.

In another possible implementation, that the processing unit interrupts the data transmission of the non-highest-priority service queue, and the data of the highest-priority service queue is transmitted if there is to-be-transmitted data in the highest-priority service queue specifically includes:

When the transceiver unit is sending a physical layer protocol data unit PPDU data frame of the non-highest-priority service queue, the processing unit interrupts the process of sending the PPDU data frame, and adds a PPDU terminator at an interrupted position of the PPDU data frame. The PPDU terminator indicates to end the data transmission process of the non-highest-priority service queue, and indicates to the transceiver unit to transmit the data of the highest-priority service queue.

In another possible implementation, that the processing unit interrupts the data transmission of the non-highest-priority service queue, and the data of the highest-priority service queue is transmitted if there is to-be-transmitted data in the highest-priority service queue specifically includes:

When the transceiver unit is in a phase of sending a PPDU control frame of the non-highest-priority service queue, a PPDU terminator is added to a tail of the PPDU control frame. The PPDU terminator indicates to end the data transmission process of the non-highest-priority service queue, and indicates to the transceiver unit to transmit the data of the highest-priority service queue after transmission of the PPDU control frame is completed.

In another possible implementation, that the processing unit interrupts the data transmission of the non-highest-priority service queue, and the data of the highest-priority service queue is transmitted if there is to-be-transmitted data in the highest-priority service queue specifically includes:

When the transceiver unit is in a phase of receiving the data of the non-highest-priority service queue, after receiving the data, the transceiver unit sends a PPDU control frame, and adds a PPDU terminator to a tail of the PPDU control frame. The PPDU terminator indicates to end the data transmission process of the non-highest-priority service queue and to transmit the data of the highest-priority service queue after transmission of the PPDU control frame is completed.

In another possible implementation, that the processing unit interrupts the data transmission of the non-highest-priority service queue, and the data of the highest-priority service queue is transmitted if there is to-be-transmitted data in the highest-priority service queue specifically includes:

When the transceiver unit is in a phase of receiving the data of the non-highest-priority service queue, and the transceiver unit needs to send a PPDU null frame after receiving the data, if there is to-be-transmitted data in the highest-priority service queue, the transceiver unit sends a PPDU null frame that includes only a PPDU header and a PPDU terminator. The PPDU null frame indicates to end the data transmission process of the non-highest-priority service queue and to transmit the data of the highest-priority service queue. In other words, after receiving the data, the transceiver unit stops sending the PPDU data frame that needs to be sent, and instead sends a null frame that includes only the PPDU header and the PPDU terminator, to interrupt the data transmission process of the non-highest-priority service queue.

In the foregoing implementation, the PPDU terminator may be an extremely high throughput-long training field EHT-LTF sequence obtained through 90-degree phase rotation.

With reference to the third aspect, in another possible design, the communication apparatus structurally includes a transceiver and at least one processor. The transceiver is configured to send and receive data, and is configured to communicate and interact with another device in a communication system. The at least one processor is configured to support the communication apparatus in performing a corresponding function of the first communication apparatus in the first aspect and each possible design example of the first aspect or a corresponding function of the first communication apparatus in the second aspect and each possible design example of the second aspect. For details, refer to detailed descriptions in the method example. Details are not described herein again.

Optionally, the communication apparatus further includes a memory. The memory is coupled to the processor, and stores program instructions and data that are necessary for the communication apparatus.

According to a fourth aspect, an embodiment of this application provides a computer-readable storage medium. The computer-readable storage medium stores program instructions. When the program instructions are run on a computer, the computer is enabled to perform any one of the first aspect or the possible designs of the first aspect, or any one of the second aspect or the possible designs of the second aspect in embodiments of this application.

According to a fifth aspect, an embodiment of this application provides a communication system, which may include the foregoing first communication apparatus, another communication apparatus that communicates with the first communication apparatus, and the like.

According to a sixth aspect, an embodiment of this application provides a computer program product including computer program code or instructions. When the computer program code or instructions are run on a computer, the computer is enabled to implement the method according to any one of the first aspect or the possible designs of the first aspect, or the method according to any one of the second aspect or the possible designs of the second aspect.

According to a seventh aspect, this application further provides a chip system. The chip system includes a logic circuit and an input/output interface. The input/output interface is configured to input or output information. The logic circuit is configured to implement the method according to the first aspect or the possible designs of the first aspect, or the method according to the second aspect or the possible designs of the second aspect.

For all aspects in the third aspect to the seventh aspect and possible technical effect in each aspect, refer to descriptions of technical effect that can be achieved in the possible solutions of the first aspect and the second aspect. Details are not described herein again.

DESCRIPTION OF EMBODIMENTS

The following further describes in detail embodiments of this application with reference to the accompanying drawings.

Embodiments of this application provide a service transmission method and an apparatus. The method and the apparatus in this application are based on the same technical concept. Because problem-resolving principles of the method and the apparatus are similar, mutual reference may be made to implementation of the apparatus and the method. Repeated parts are not described again.

In the descriptions of this application, terms such as "first" and "second" are only for distinction and description, but do not indicate or imply relative importance, nor indicate or imply an order.

In embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be singular or plural. The character "/" generally represents an "or" relationship between the associated objects. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

To describe the technical solutions in embodiments of this application more clearly, the following describes the communication method and apparatus according to embodiments of this application in detail with reference to the accompanying drawings.

Figure 1:
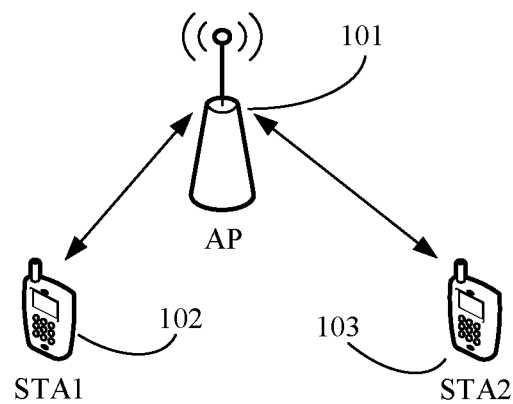
FIG. 1 is a schematic diagram of an architecture of a communication system according to this application.

FIG. 1 shows a possible architecture of a communication system to which a communication method according to an embodiment of this application is applicable. The architecture of the communication system includes at least one access point (AP) (for example, the AP 101 in FIG. 1) and at least one station (STA) (for example, the STA1 102 and the STA2 103 in FIG. 1). The AP may include but is not limited to a communication server, a router, a switch, a bridge, and the like. The STA may include but is not limited to a mobile phone, a tablet computer (Pad), a computer notebook, a smartwatch, a smart television, and the like. It should be noted that the STA may be generally the AP, for example, the router, or may be a non-access point station (non-AP STA), for example, the mobile phone.

Figure 2:
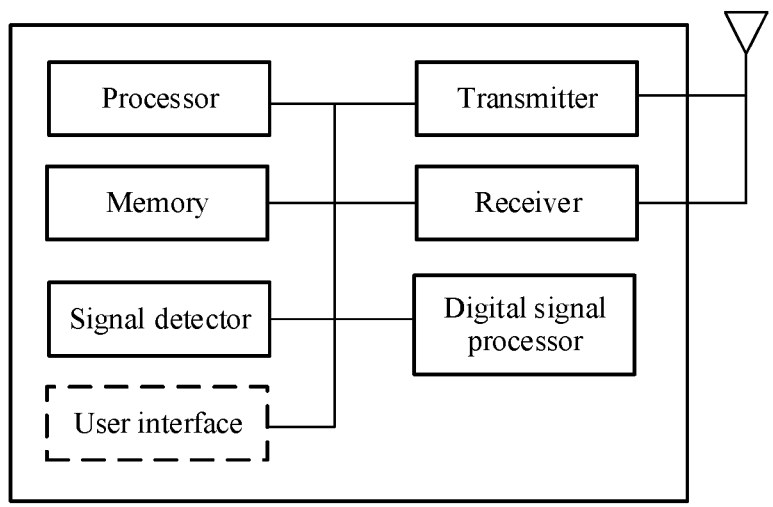
FIG. 2 is a schematic diagram of a structure of an AP or a STA according to this application.

For example, a specific structure of the AP or the STA may be shown in a structural diagram shown in FIG. 2, and may include a processor, a memory, a transmitter, a receiver, a signal detector, and a digital signal processor. Optionally, the AP or the STA may further include a user interface. Alternatively, the transmitter and the receiver may be combined into a transceiver. This is not limited in this application.

It should be noted that a name of a device shown in FIG. 1 is merely an example, and there may be another name in a future communication system. A quantity of devices in FIG. 1 is also merely an example, and more or fewer devices may be further included. This is not limited in this application.

A method provided in this application is applicable to data communication between the AP and one or more STAs, or data communication between the APs, or data communication between the STAs. This is not limited in this application.

The following describes some terms or concepts in this application, to facilitate understanding by a person skilled in the art.

(1) Data Transmission Under a CSMA/CA Mechanism

In IEEE802.11, basic data transmission complies with the CSMA/CA mechanism (also referred to as a DCF mechanism). The mechanism provides that a node needs to contend for a channel before sending data. The node can transmit the data only after it successfully obtains the channel through contention, to avoid a collision. One data transmission may be divided into three steps. Specifically, the three steps include:

(1) Channel detection: When a node needs to send data, the node first needs to wait for a DCF inter frame spacing (DIFS). If it is detected that a channel is always in an idle state within the DIFS, the node enters a backoff process: otherwise, the node continues to wait.

(2) Backoff: Based on a value of a backoff counter, each time the node detects that a channel is idle within one slot time, the value of the counter is decremented by 1. The process is continuously repeated until the value of the counter is 0. Then, the node enters a data transmission process. If it is detected that a channel is occupied in a countdown process of the counter, the counter stops counting down, a value of the counter is stored, and the node exits the backoff process and enters the channel monitoring process again. For a new backoff process, the node selects a random number from a contention window as the value of the backoff counter. A size of the contention window has different fixed values for different physical (PHY) layer technologies. For backoff interrupted last time, the value of the backoff counter is a value stored when the backoff is interrupted.

(3) Data sending and receiving: After obtaining a channel through contention, the node completes channel access, and performs one data exchange.

(2) EDCA

To support quality of service (QOS), two media access control (MAC) mechanisms are added to IEEE802.11e for sending and receiving data, and the two mechanisms are enhanced distributed channel access (EDCA) and hybrid controlled channel access (HCCA). EDCA defines four access types and supports eight user priorities. The four access types are background (BK), best effort (BE), video (VI), and voice (VO). The eight priorities 0 to 8 are the same as those defined in 802.1D. The access type corresponds to the user priority. In a channel monitoring phase, different from a DCF mechanism in which one DIFS is halted, an arbitration inter frame spacing (AIFS) is halted in the EDCA mechanism. The duration of the AIFS may be a different value configured by a management plane for different access types. In a backoff phase, a size of a contention window may be a different value configured by the management plane for different access types. In a data sending and receiving phase, a plurality of times of data exchange may be performed within a transmission opportunity (TXOP) time, and the TXOP duration is a different value configured by the management plane for different access types.

An EDCA access type parameter can be adjusted. An AP modifies a default EDCA access type parameter of the STA by using a management frame such as a beacon, a probe response, or an association response, to provide different contention parameters for different STAs. This increases a probability of contending for air interface resources by some STAs, and decreases a probability of contending for air interface resources by some other STAs.

Figure 3:
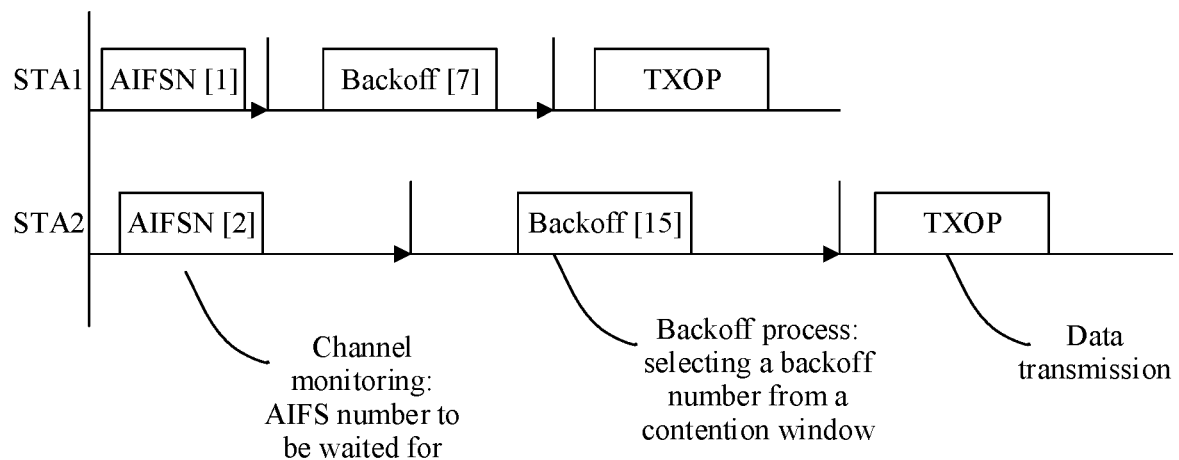
FIG. 3 is a schematic diagram of a service queue transmission process according to this application.

For example, FIG. 3 shows a channel access priority process of a STA1 and a STA2. Parameters shown in Table I are set for the STA1 and the STA2. An AC is an access category (AC). CWmin and CWmax are the minimum and maximum values of a contention window. AIFSN is an arbitration inter frame spacing number (AIFS Number, AIFSN). The STA1 and STA2 have a same access type: a VO type. However, the STA1 has a smaller AIFSN and a smaller contention window; and therefore, a service of the VO type of the STA1 is more likely to obtain a TXOP and has a higher probability to obtain a transmission opportunity.

TABLE 1

|  | AC | CWmin | CWmax | AIFSN | TXOP |
| --- | --- | --- | --- | --- | --- |
| STA1 | VO | 3 | 7 | 1 | 2.080 ms |
| STA2 | VO | 15 | 30 | 2 | 2.080 ms |

Figure 4:
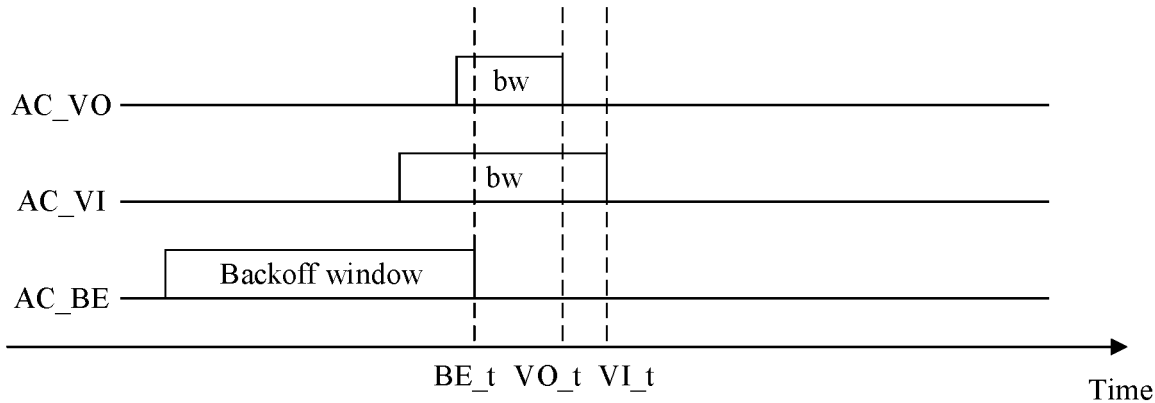
FIG. 4 is a schematic diagram of another service queue transmission process according to this application.

In the EDCA mechanism, an access type parameter is used to change a priority of a service of the STA, so that priorities of services of the same type are differentiated on different STAs, to differentiate user priorities instead of service priorities. When the STA has a plurality of different service types, even if an EDCA parameter is adjusted to provide different channel probabilities for different service types and thereby increase a priority macroscopically, cases can still occur in which a lower-priority service is transmitted first while a higher-priority service waits. FIG. 4 is a schematic diagram of transmission contention between different service types in a STA. Service data of an AC_BE first enters a queue, passes through an AIFS and a backoff window; obtains a TXOP at a moment BE_t, and starts to transmit data. Although AC_VO has the smallest idle waiting time AIFS and the smallest contention window among all access types, because the service data enters the queue late, the data cannot be transmitted until VO_t. Therefore, a higher-priority VO service is transmitted later than a lower-priority BE service in a STA. Because a Wi-Fi system uses an unlicensed spectrum, a transmission mechanism of the Wi-Fi system complies with basic CSMA/CA. A higher-priority service in the Wi-Fi system may obtain a channel through contention to send data only after another service that currently obtains a channel completes data transmission. Therefore, latency increases, and service requirements cannot be met.

Based on the foregoing problem, an embodiment of this application provides a service transmission method, to interrupt a current lower-priority service transmission procedure when a higher-priority service occurs in an 802.11 system. This enables the higher-priority service to preferably obtain an accessing and transmission opportunity.

Figure 5:
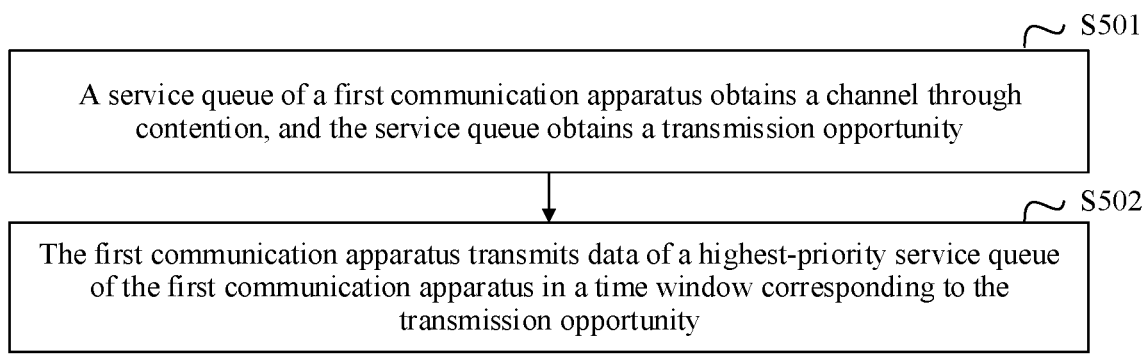
FIG. 5 is a flowchart of a service queue transmission process method according to this application.

The service transmission method provided in this embodiment of this application is applicable to the communication system shown in FIG. 1. Specifically, as shown in FIG. 5, the method includes the following steps.

S501: A service queue of a first communication apparatus obtains a channel through contention, and the service queue obtains a data transmission opportunity.

The first communication apparatus may be an AP or a STA, or may be a chip used in the AP or the STA.

S502: The first communication apparatus transmits data of a highest-priority service queue of the first communication apparatus in a time window corresponding to the transmission opportunity.

The foregoing embodiment ensures the data of the highest-priority service queue is transmitted first in the time window corresponding to the transmission opportunity:

In a process in which the service queue of the first communication apparatus contends for the channel, the service queue obtains the channel through contention to obtain the transmission opportunity. The service queue that obtains the channel through contention may have queues of various priorities.

In a possible implementation, when a non-highest-priority service queue obtains a channel through contention, data of the non-highest-priority service queue obtains a transmission opportunity. If there is to-be-transmitted data in the highest-priority service queue, the non-highest-priority service queue that obtains the channel through contention gives a transmission opportunity to the highest-priority service queue. In other words, when the non-highest-priority service queue obtains the channel through contention before the highest-priority service queue, it is determined that the highest-priority service queue is the transmission queue, and the highest-priority service queue enters a data sending and receiving phase first. The non-highest-priority service queue reselects a contention parameter to contend for a channel.

Based on the foregoing solution, the data of the highest-priority service queue can be transmitted first, to reduce the service waiting latency.

In another possible implementation, in a process in which the service queue of the first communication apparatus contends for the channel, only the highest-priority service queue is allowed to contend for the channel, and another non-highest-priority service queue suspends channel contention. After obtaining the channel through contention, the highest-priority service queue directly enters the data sending and receiving phase.

It should be noted that, according to a priority definition in the EDCA mechanism, AC_VO may be considered as a highest priority, or a new highest priority type, for example, AC_CR, and a contention parameter, for example, AIFS, CW, and a TXOP limit, used by the new highest priority type may be defined.

In addition, the highest-priority service queue in this embodiment of this application may be an absolute highest-priority service queue. For example, AC_VO in the EDCA mechanism is a highest priority. Alternatively, the highest-priority service queue in this embodiment of this application may be a relatively highest-priority service queue in all of the to-be-transmitted queues. For example, if a service priority type included in the current to-be-transmitted queue is AC_BK, AC_BE, or AC_VI, it is considered that AC_VI is a highest-priority service queue in the current to-be-transmitted queue.

The foregoing embodiment ensures that in a channel contention phase, the highest-priority service queue obtains the transmission opportunity first. Even if the non-highest-priority service queue preempts a channel before the highest-priority service queue, the non-highest-priority service queue gives up the data transmission opportunity, and gives the transmission opportunity to the highest-priority service queue, so that the highest-priority service queue has an opportunity to preferably transmit data.

Further, an embodiment of this application provides another service transmission method. The method is used to transmit data of a service queue. Specifically, the method is used to transmit data of non-highest-priority service queue. If there is to-be-transmitted data in a highest-priority service queue, data transmission of the non-highest-priority service queue is interrupted, and the data of the highest-priority service queue is transmitted.

Figure 6:
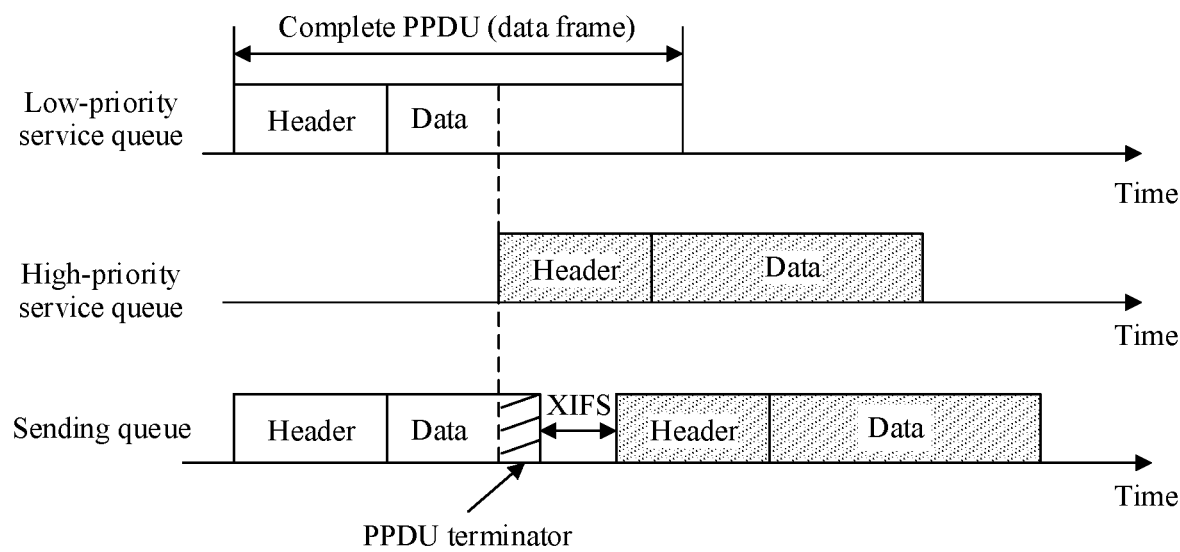
FIG. 6 is a schematic diagram of another service queue transmission process according to this application.

Specifically, in a possible implementation, when a first communication apparatus is in a data sending phase of the non-highest-priority service queue, and currently is sending a physical layer protocol data unit PPDU data frame, if there is to-be-transmitted data in the highest-priority service queue, the first communication apparatus interrupts sending of the non-highest-priority service queue PPDU, and adds a PPDU terminator at an interrupted position of a PPDU data frame. The terminator indicates to end the data transmission of the non-highest-priority service queue. In other words, the PPDU terminator is used to notify a peer end that transmission is preempted by the highest-priority service queue and is stopped. The highest-priority service queue obtains a transmission opportunity. For example, as shown in FIG. 6, the data of the highest-priority service queue is transmitted at an XFIS (for example, an SIFS) after the PPDU terminator is sent.

In the foregoing embodiment, the first communication apparatus is allowed to interrupt sending the data frame of the non-highest-priority service queue, to reduce waiting time for sending the highest-priority service queue, thereby reducing service latency. In addition, the peer end does not need to participate in negotiation and scheduling.

Figure 7:
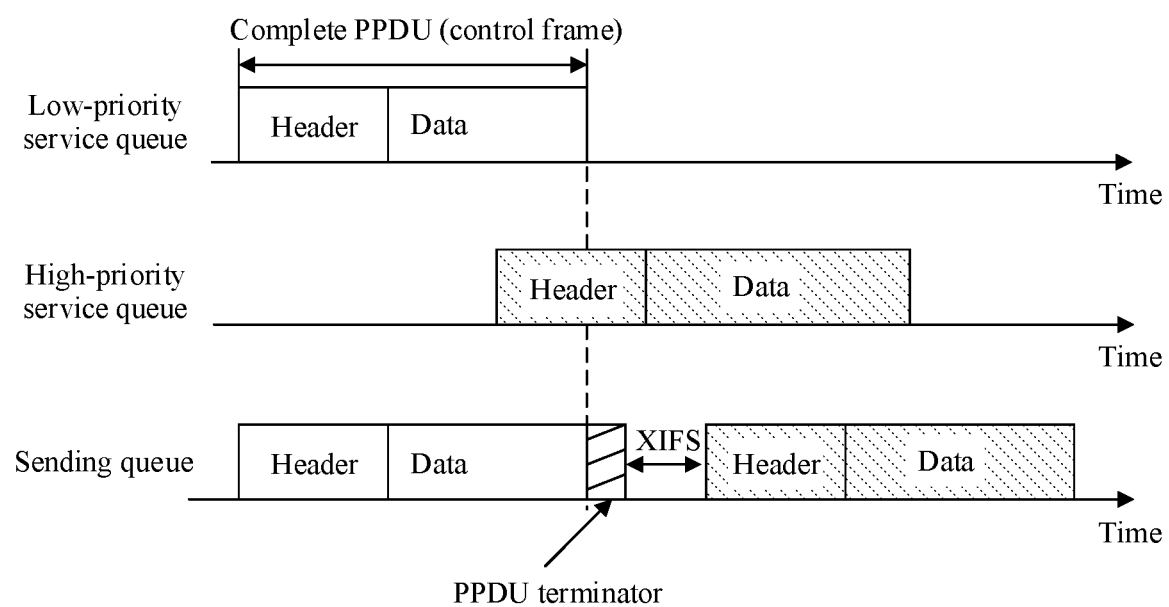
FIG. 7 is a schematic diagram of yet another service queue transmission process according to this application.

In another possible implementation, when the first communication apparatus is in a data sending phase of the non-highest-priority service queue, and is currently sending a PPDU control frame, if there is to-be-transmitted data in the highest-priority service queue, after the PPDU control frame is completely sent, the first communication apparatus interrupts a data transmission process of the non-highest-priority service queue, and adds a PPDU terminator to a tail of the PPDU control frame. The terminator indicates to interrupt data transmission of the non-highest-priority service queue and give the data transmission opportunity to the highest-priority service queue. Then, the data of the highest-priority service queue is transmitted. In other words, the PPDU terminator is used to notify a peer end that transmission is preempted by the highest-priority service queue and is stopped. The data of the highest-priority service queue obtains a transmission opportunity. For example, as shown in FIG. 7, the data of the highest-priority service queue is transmitted at an XFIS (for example, an SIFS) after the PPDU terminator is sent.

In the foregoing embodiment, the first communication apparatus is allowed to interrupt an interaction process of the non-highest-priority service queue, ensure the integrity of sending the control frame of the non-highest-priority service queue, and reduce the waiting time for sending the highest-priority service queue, thereby reducing service latency.

Figure 8:
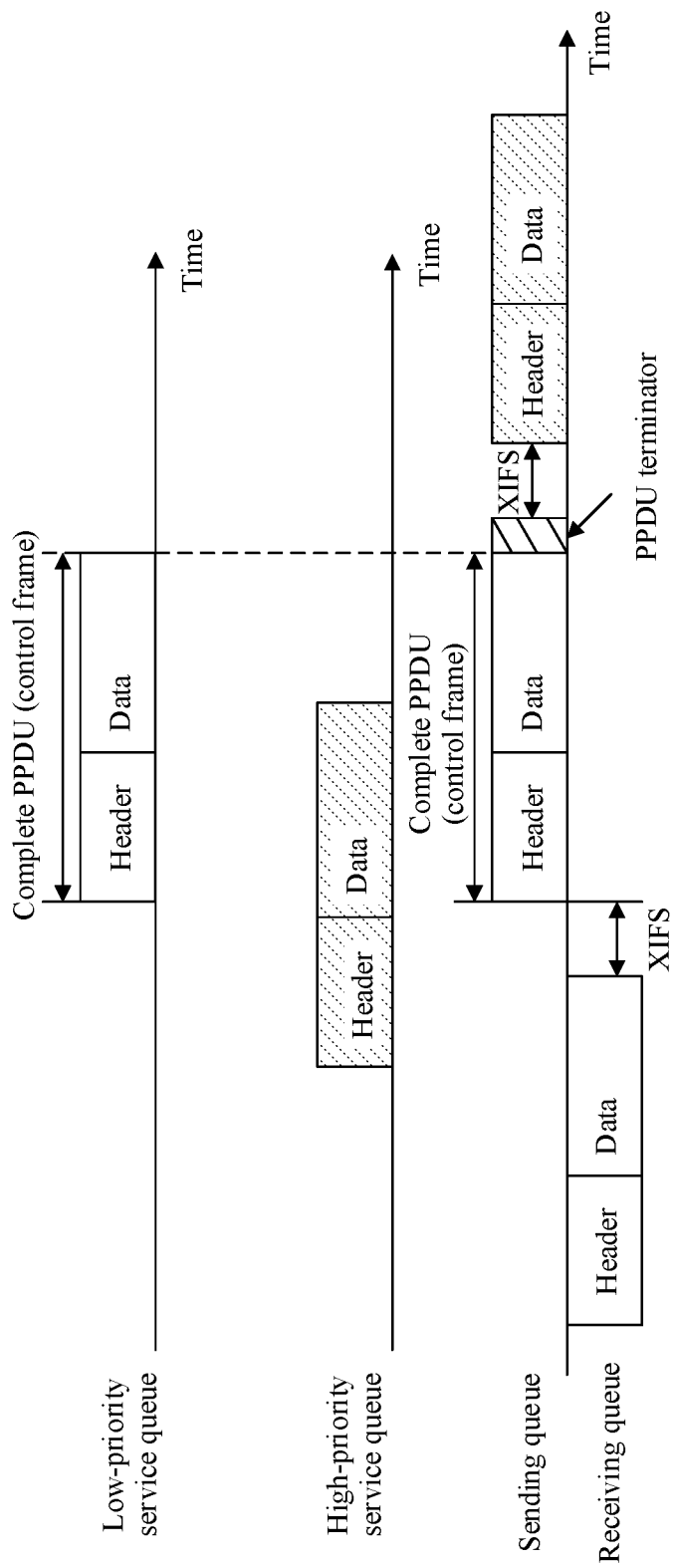
FIG. 8 is a schematic diagram of still yet another service queue transmission process according to this application.

In another possible implementation, the first communication apparatus is in a phase of receiving data of the non-highest-priority service queue, and needs to send a PPDU control frame after receiving data. In this case, if there is to-be-transmitted data in the highest-priority service queue, the first communication apparatus receives data of the non-highest-priority service queue. In addition, after the PPDU control frame is sent, a data transmission process of the non-highest-priority service queue is interrupted. A PPDU terminator is added to a tail of the PPDU control frame. The terminator indicates to interrupt the data transmission of the non-highest-priority service queue and give a data transmission opportunity to the highest-priority service queue. Then, the data of the highest-priority service queue is transmitted. In other words, the PPDU terminator is attached to the tail of the PPDU control frame and sent to a peer end. After receiving the PPDU terminator, the peer end learns that the transmission has been preempted by the highest priority. Therefore, the peer end stops responding to the control frame and interrupts a remaining interaction process. For example, as shown in FIG. 8, the data of the highest-priority service queue is transmitted at an XFIS (for example, an SIFS) after the PPDU terminator is sent.

In the foregoing embodiment, sending of the control frame of the non-highest-priority service queue is allowed to complete, and the peer end is notified of occurrence of the interruption, to avoid an impact on the peer end. In addition, the data of the highest-priority service queue can be sent in advance before the non-highest-priority service queue ends a complete interaction process, to reduce service latency.

Figure 9:
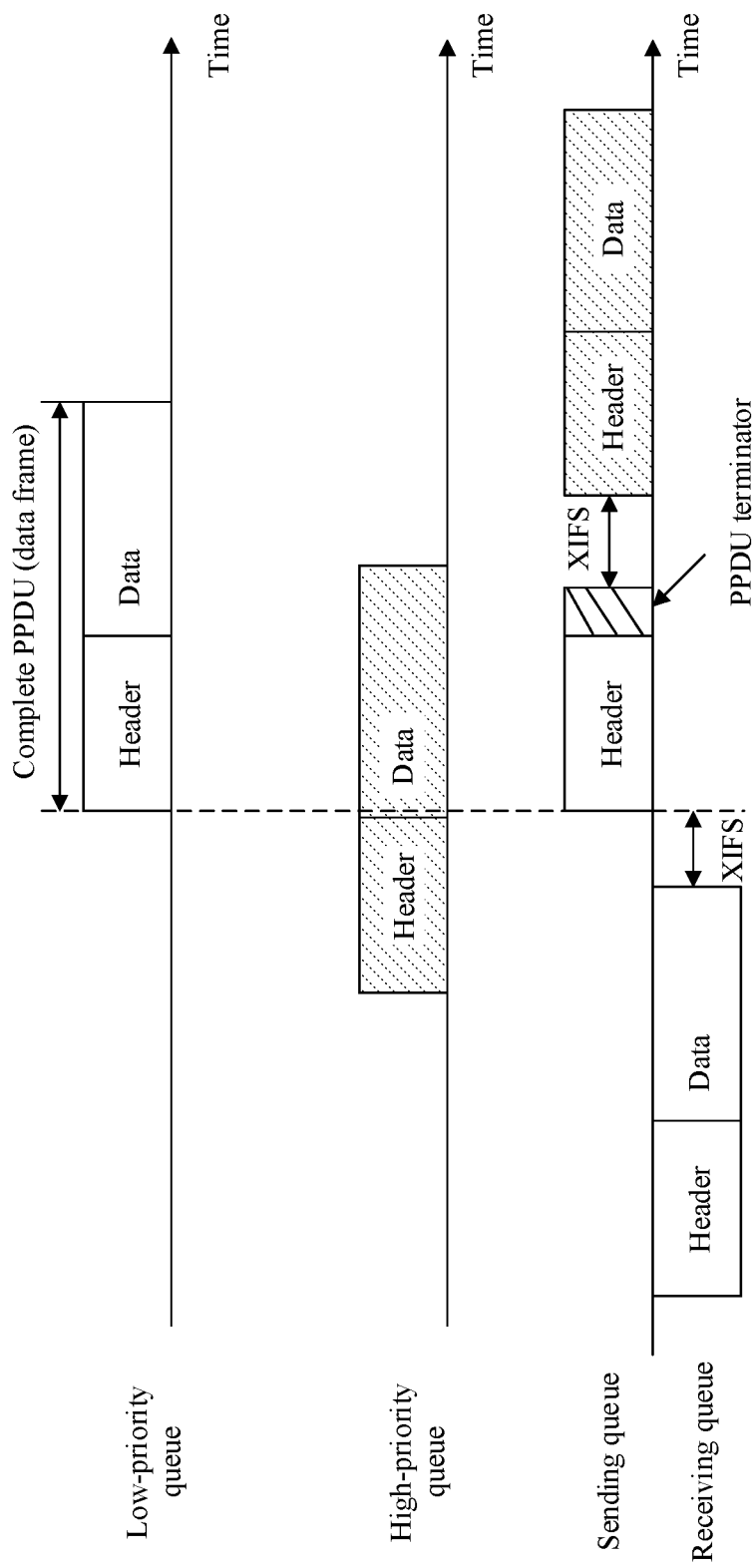
FIG. 9 is a schematic diagram of a further service queue transmission process according to this application.
Figure 10A:
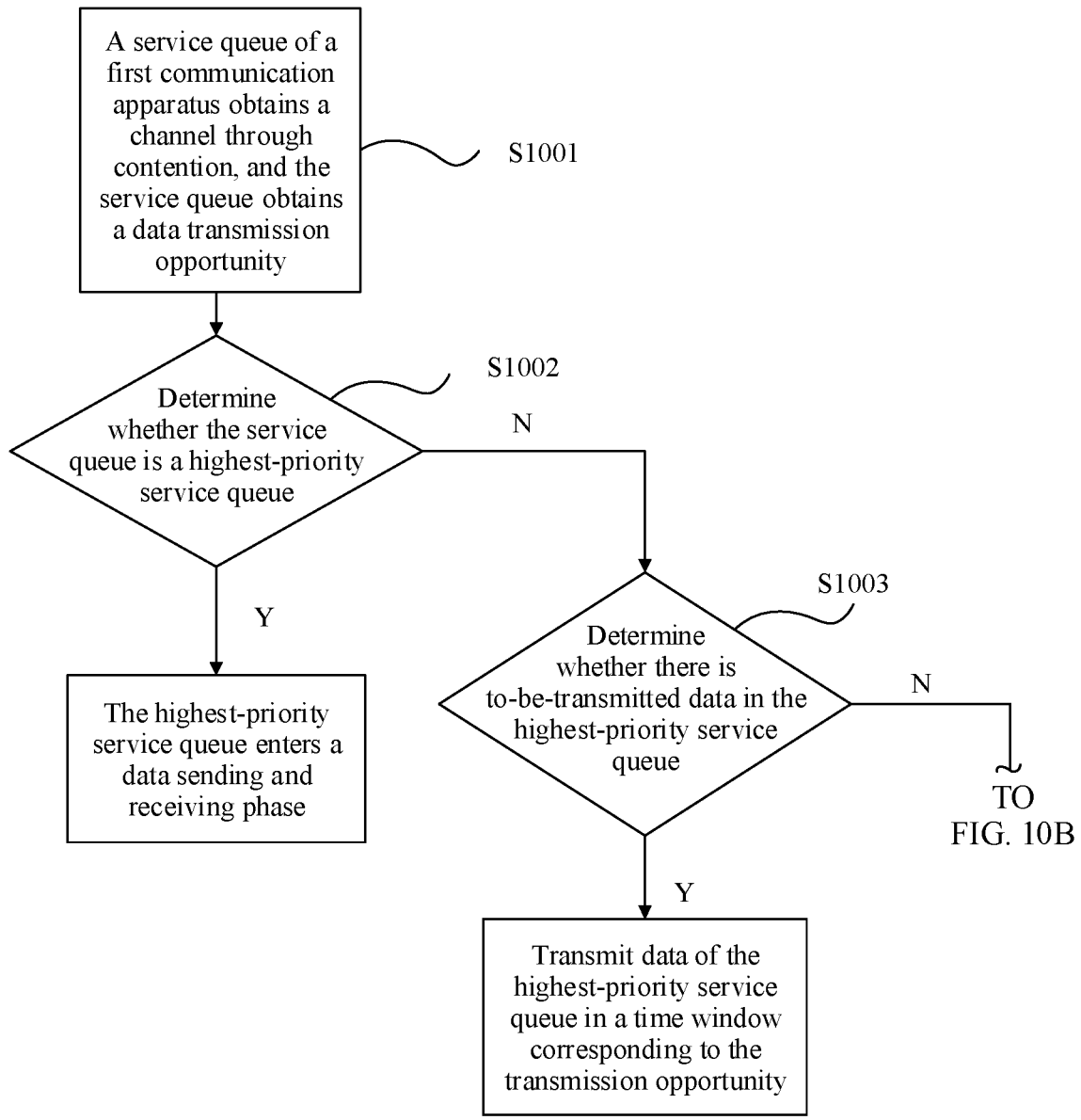
FIG. 10A and FIG. 10B are a flowchart of another service queue transmission process method according to this application.
Figure 10B:
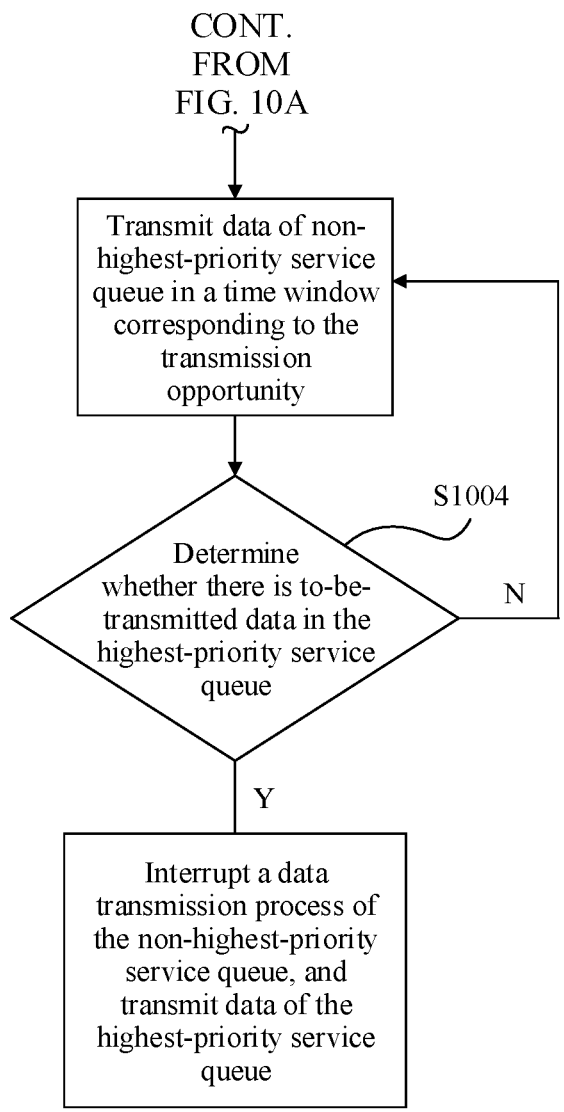

In another possible implementation, when the first communication apparatus is in a data receiving phase of the non-highest-priority service queue, and needs to send a PPDU data frame after receiving data, if there is to-be-transmitted data in the highest-priority service queue, after receiving the data of the non-highest-priority service queue, the first communication apparatus sends a PPDU null frame including only a PPDU header and a PPDU terminator. The PPDU null frame indicates to interrupt the data transmission of the non-highest-priority service queue, and to give a data transmission opportunity to the highest-priority service queue. Then, the data of the highest-priority service queue is transmitted. In other words, after receiving the data, the first communication apparatus stops sending the PPDU data frame that needs to be sent, and instead sends a null frame that includes only the PPDU header and the PPDU terminator, to interrupt a data transmission process of the non-highest-priority service queue. In other words, the PPDU null frame is sent to a peer end to notify the peer end that the transmission is preempted by the highest priority, and the remaining interaction process is interrupted. For example, as shown in FIG. 9, the data of the highest-priority service queue is transmitted at an XFIS (for example, an SIFS) after the PPDU null frame is sent.

In the foregoing embodiment, the highest-priority service queue is allowed to preempt sending a non-highest-priority data frame, and data is sent in advance before the non-highest-priority service queue ends a complete interaction process, thereby reducing service latency.

In embodiments of this application. FIG. 6 to FIG. 9 show PPDUs transmitted at a physical layer. The PPDU includes a PPDU header and a data part. The PPDU control frame and the PPDU data frame are relative to a medium access control (MAC) layer. In other words, if MAC content included in the data part of the PPDU is a data frame, the PPDU may be understood as the PPDU data frame in the application. If MAC content included in the data part of the PPDU is a control frame, the PPDU may be understood as a PPDU control frame in this application. For brevity, details are not described herein again.

In the foregoing implementation, the PPDU terminator may be an extremely high throughput-long training field EHT-LTF sequence obtained through 90-degree phase rotation.

Further, with reference to a channel contention process and a data transmission process, this application provides still another service transmission method. The method includes the following steps.

S1001: A service queue of a first communication apparatus obtains a channel through contention, and the service queue obtains a data transmission opportunity.

In a possible implementation, service queues of various priorities of the first communication apparatus may independently contend for a channel in a priority contention manner (for example, EDCA). If any service queue successfully obtains the channel through contention, the service queue obtains a transmission opportunity, and step S1002 is performed.

In another possible implementation, only a highest-priority service queue is allowed to contend for a channel, and another non-highest-priority service queue suspends channel contention. The highest-priority service queue successfully obtains the channel through contention and directly enters a data sending and receiving phase of the highest-priority service queue.

S1002: Determine a service queue that obtains the transmission opportunity.

If the service queue is the highest-priority service queue, data of the highest-priority service queue is transmitted in a time window corresponding to the transmission opportunity.

If the service queue is the non-highest-priority service queue, step 1003 is performed.

S1003: Determine whether there is to-be-transmitted data in the highest-priority service queue.

If there is to-be-transmitted data in the highest-priority service queue, the non-highest-priority service queue gives the transmission opportunity to the highest-priority service queue, and the data of the highest-priority service queue is transmitted in the time window corresponding to the transmission opportunity.

If there is no to-be-transmitted data in the highest-priority service queue, data of the non-highest-priority service queue is transmitted in the time window corresponding to the transmission opportunity.

Further, in a transmission process of the non-highest-priority service queue, as shown in S1004, it may be determined whether there is to-be-transmitted data in the highest-priority service queue. If there is to-be-transmitted data in the highest-priority service queue, the first communication apparatus may interrupt a data transmission process of the non-highest-priority service queue, and transmit the data of the highest-priority service queue. Specifically, for a description of how the first communication apparatus interrupts the data transmission process of the non-highest-priority service queue, refer to the foregoing embodiments. Details are not described herein again. If there is no to-be-transmitted data in the highest-priority service queue, the data transmission process of the non-highest-priority service queue is continued.

Figure 11:
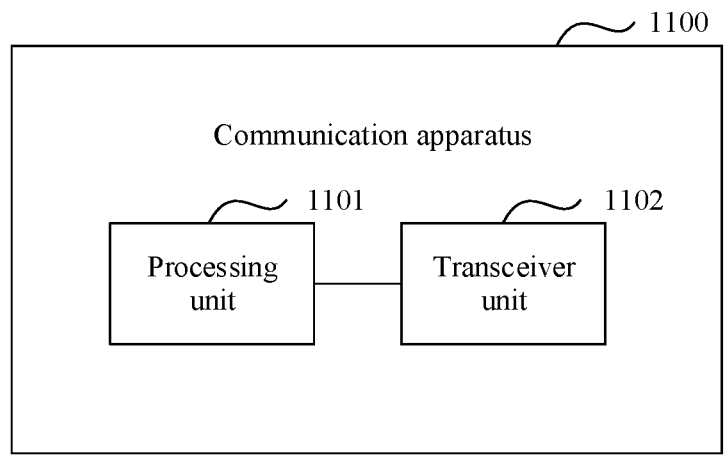
FIG. 11 is a schematic diagram of a structure of a communication apparatus according to this application.

Based on the foregoing embodiments, an embodiment of this application further provides a communication apparatus. Refer to FIG. 11. The communication apparatus 1100 may include a processing unit 1101 and a transceiver unit 1102. The transceiver unit 1102 is configured to perform communication transmission by using the communication apparatus 1100, for example, receive information (a frame, a message, or data) or send the information (the frame, the message, or the data). The processing unit 1101 is configured to control an action of the communication apparatus 1100. The processing unit 1101 may further control steps performed by the transceiver unit 1102.

For example, the communication apparatus 1100 may be the first communication apparatus in the foregoing embodiments, and may be specifically a processor, a chip, a chip system, a function module, or the like in the first communication apparatus. Specifically, when the communication apparatus 1100 is configured to implement functions of the first communication apparatus in the foregoing embodiments, the communication apparatus 1100 may specifically include:

The processing unit 1101 is configured to contend for a channel by a service queue, so that a service queue that obtains a channel through contention obtains a transmission opportunity.

The processing unit 1101 is further configured to control the transceiver unit 1102 to transmit data of a highest-priority service queue in a time window corresponding to the transmission opportunity.

In addition, the processing unit 1101 may be further configured to determine whether a service queue that obtains the transmission opportunity is the highest-priority service queue or a non-highest-priority service queue.

The transceiver unit 1102 is configured to perform communication transmission.

In another possible implementation, when the non-highest-priority service queue obtains a channel through contention, in the time window corresponding to the transmission opportunity, the processing unit 1101 may determine whether there is to-be-transmitted data in the highest-priority service queue. If there is to-be-transmitted data in the highest-priority service queue, the transceiver unit 1102 transmits the data of the highest-priority service queue, and the non-highest-priority service queue contends for a channel again. If there is no to-be-transmitted data in the highest-priority service queue, the transceiver unit 1102 transmits data of the non-highest-priority service queue.

In still another possible implementation, the processing unit 1101 allows only the highest-priority service queue to contend for a channel, and a non-highest-priority service queue suspends channel contention.

Further, in a data transmission process of the non-highest-priority service queue, if there is to-be-transmitted data in the highest-priority service queue, the processing unit 1101 interrupts the data transmission of the non-highest-priority service queue, and controls the transceiver unit 1102 to transmit the data of the highest-priority service queue.

Specifically, in a possible implementation, when the transceiver unit 1102 is in a phase of sending a physical layer protocol data unit PPDU data frame of the non-highest-priority service queue, the processing unit 1101 interrupts a process of sending the PPDU data frame, and adds a PPDU terminator at an interrupted position of the PPDU data frame. The PPDU terminator indicates to end the data transmission process of the non-highest-priority service queue, and indicates the transceiver unit 1102 to transmit the data of the highest-priority service queue.

In another possible implementation, when the transceiver unit 1102 is in a phase of sending a PPDU control frame of the non-highest-priority service queue, a PPDU terminator is added to a tail of the PPDU control frame. After transmission of the PPDU control frame is completed, the transceiver unit 1102 transmits the data of the highest-priority service queue.

In another possible implementation, when the transceiver unit 1102 is in a phase of receiving the data of the non-highest-priority service queue, and the transceiver unit 1102 needs to send a PPDU control frame after receiving the data, the transceiver unit 1102 adds a PPDU terminator to a tail of the PPDU control frame, and transmits the data of the highest-priority service queue after the transmission of the PPDU control frame is completed.

In another possible implementation, when the transceiver unit 1102 is in a phase of receiving the data of the non-highest-priority service queue, and the transceiver unit 1102 needs to send a PPDU data frame after receiving the data, the transceiver unit 1102 sends a PPDU null frame that includes only a PPDU header and a PPDU terminator. The PPDU null frame indicates to end the data transmission process of the non-highest-priority service queue, and indicates the transceiver unit 1102 to transmit the data of the highest-priority service queue. In other words, after receiving the data, the transceiver unit 1102 stops sending the PPDU data frame that needs to be sent, and instead sends a null frame that includes only the PPDU header and the PPDU terminator, to interrupt the data transmission process of the non-highest-priority service queue.

The PPDU terminator may be an extremely high throughput-long training field (EHT-LTF) sequence obtained through 90-degree phase rotation.

It should be noted that, in embodiments of this application, division into units is an example and is merely logical function division. During actual implementation, there may be another division manner. In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions to enable a computer device (which may be a personal computer, a server, a network device, or the like) or the processor to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

Figure 12:
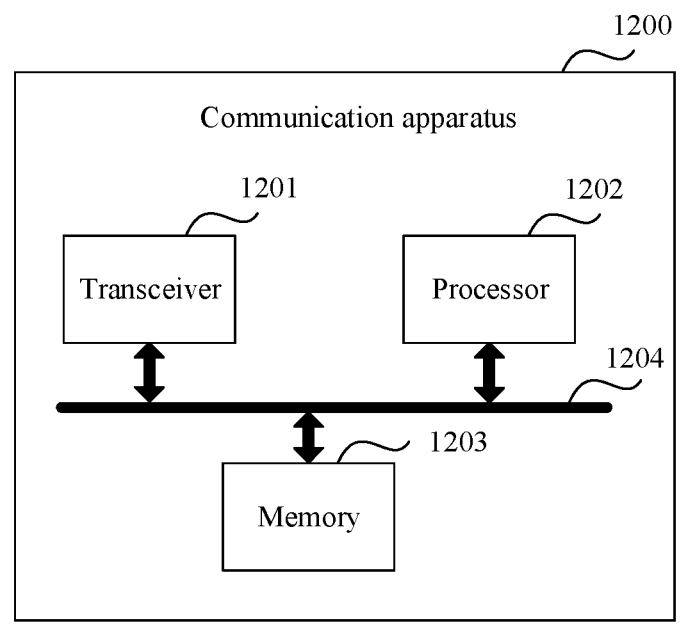
FIG. 12 is a schematic diagram of another structure of a communication apparatus according to this application.

Based on the foregoing embodiments, an embodiment of this application further provides a communication apparatus. Refer to FIG. 12. The communication apparatus 1200 may include a transceiver 1201 and a processor 1202. Optionally, the communication apparatus 1200 may further include a memory 1203. The memory 1203 may be disposed inside the communication apparatus 1200, or may be disposed outside the communication apparatus 1200. The processor 1202 may control the transceiver 1201 to receive and send data.

Specifically, the processor 1202 may be a central processing unit (CPU), a network processor (NP), or a combination of a CPU and an NP. The processor 1202 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The transceiver 1201, the processor 1202, and the memory 1203 are connected to each other. Optionally, the transceiver 1201, the processor 1202, and the memory 1203 are connected to each other by using a bus 1204. The bus 1204 may be a peripheral component interconnect (PCI) bus, an extended industry standard architecture (EISA) bus, or the like. The bus may be classified into an address bus, a data bus, a control bus, and the like. For ease of representation, only one thick line represents the bus in FIG. 12, but this does not mean that there is only one bus or only one type of bus.

In an optional implementation, the memory 1203 is configured to store a program and the like. Specifically, the program may include program code, and the program code includes computer operation instructions. The memory 1203 may include a RAM, or may further include a non-volatile memory, for example, one or more magnetic disk memories. The processor 1202 executes an application stored in the memory 1203 to implement the foregoing functions, thereby implementing functions of the communication apparatus 1200.

For example, the communication apparatus 1200 may be the foregoing first communication apparatus. When the communication apparatus 1200 is configured to implement functions of the first communication apparatus in the foregoing embodiments, the communication apparatus 1200 may specifically include:

The transceiver 1201 is configured to perform communication transmission.

The processor 1202 is configured to contend for a channel by a service queue, so that a service queue that obtains a channel through contention obtains a data transmission opportunity.

The processor 1202 is configured to control the transceiver 1201 to transmit data of a highest-priority service queue in a time window corresponding to the transmission opportunity.

In addition, the processor 1202 may be further configured to determine whether the service queue that obtains a transmission opportunity is the highest-priority service queue or a non-highest-priority service queue.

In a possible implementation, when the non-highest-priority service queue obtains a channel through contention, in the time window corresponding to the transmission opportunity, the processor 1202 may determine whether there is to-be-transmitted data in the highest-priority service queue. If there is to-be-transmitted data in the highest-priority service queue, the transceiver 1201 transmits the data of the highest-priority service queue, and the non-highest-priority service queue contends for a channel again. If there is no to-be-transmitted data in the highest-priority service queue, the transceiver 1201 transmits data of the non-highest-priority service queue.

In another possible implementation, the processor 1202 allows only the highest-priority service queue to contend for a channel, and a non-highest-priority service queue suspends channel contention.

Further, in a data transmission process of the non-highest-priority service queue, if there is to-be-transmitted data in the highest-priority service queue, the processor 1202 interrupts data transmission of the non-highest-priority service queue, and controls the transceiver 1201 to transmit the data of the highest-priority service queue.

Specifically, in a possible implementation, when the transceiver 1201 is in a phase of sending a physical layer protocol data unit PPDU data frame of the non-highest-priority service queue, the processor 1202 interrupts a process of sending the PPDU data frame, and adds a PPDU terminator at an interrupted position of the PPDU data frame. The PPDU terminator indicates to end the transmission process of the non-highest-priority service queue, and indicates the transceiver 1201 to transmit the data of the highest-priority service queue.

In another possible implementation, when the transceiver 1201 is in a phase of sending a PPDU control frame of the non-highest-priority service queue, a PPDU terminator is added to a tail of the PPDU control frame. After transmission of the PPDU control frame is completed, the transceiver 1201 transmits the data of the highest-priority service queue.

In another possible implementation, when the transceiver 1201 is in a phase of receiving the data of the non-highest-priority service queue, after receiving the data, the transceiver 1201 sends a PPDU control frame, and adds a PPDU terminator to a tail of the PPDU control frame. After transmission of the PPDU control frame is completed, the transceiver 1201 transmits the data of the highest-priority service queue.

In another possible implementation, when the transceiver 1201 is in a phase of receiving the data of the non-highest-priority service queue, the transceiver 1201 sends a PPDU null frame after receiving the data. The PPDU null frame includes only a PPDU header and a PPDU terminator. The PPDU null frame indicates to end the data transmission process of the non-highest-priority service queue, and indicates the transceiver 1201 to transmit the data of the highest-priority service queue. In other words, after receiving the data, the transceiver 1201 stops sending the PPDU data frame that needs to be sent, and instead sends a null frame that includes only the PPDU header and the PPDU terminator, to interrupt the data transmission process of the non-highest-priority service queue.

The PPDU terminator may be an extremely high throughput-long training field (EHT-LTF) sequence obtained through 90-degree phase rotation.

Figure 13:
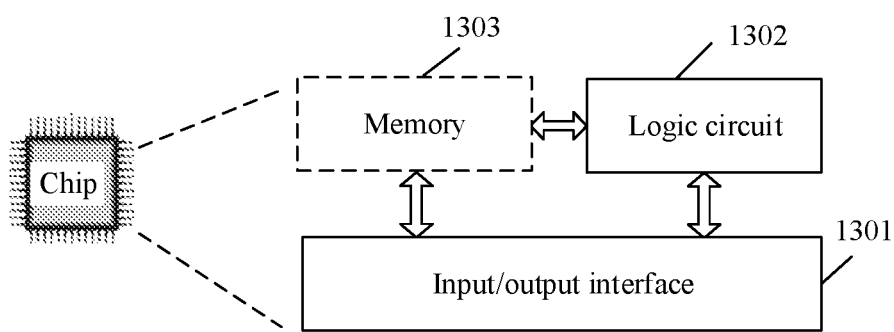
FIG. 13 is a schematic diagram of still another structure of a communication apparatus according to this application.

Based on the foregoing embodiments, an embodiment of this application further provides a communication apparatus. Refer to FIG. 13. An apparatus 1300 may be a communication apparatus or a chip in the communication apparatus. The apparatus includes:

at least one input/output interface 1301 and a logic circuit 1302. The input/output interface 1301 may be an input/output circuit. The logic circuit 1302 may be a signal processor, a chip, or another integrated circuit that can implement the method in this application.

The apparatus 1300 may further include at least one memory 1303, configured to store program instructions and/or data. The memory 1303 is coupled to the logic circuit 1302. The coupling in this embodiment of this application may be an indirect coupling or a communication connection between apparatuses, units, or modules in an electrical form, a mechanical form, or another form, and is used for information exchange between the apparatuses, the units, or the modules. The logic circuit 1302 may cooperate with the memory 1303. The logic circuit 1302 may execute the program instructions stored in the memory 1303. In a possible implementation, at least one of the at least one memory may be integrated with a logic circuit. In another possible implementation, the memory 1303 is located outside the apparatus 1300.

The at least one input/output interface 1301 is configured to input or output a signal or data.

For example, when the communication apparatus is configured to implement functions of the first communication apparatus in the foregoing embodiments, specifically, the input/output interface 1301 is configured to input or output data or information, and the logic circuit 1302 is configured to implement the method in the foregoing method embodiments. For example, the logic circuit 1302 is used by service queues to contend for a channel, so that a service queue that obtains a channel through contention obtains a transmission opportunity. The logic circuit 1302 is further configured to control the input/output interface 1301 to transmit data of a highest-priority service queue in a time window corresponding to the transmission opportunity.

It should be noted that the logic circuit 1302 is configured to perform some or all steps of any method provided in embodiments of this application. The logic circuit may implement functions implemented by the processing unit 1101 in the communication apparatus 1100 and the processor 1202 in the communication apparatus 1200.

Based on the foregoing embodiments, an embodiment of this application further provides a communication system. The communication system may include the first communication apparatus in the foregoing embodiments, another communication apparatus that communicates with the first communication apparatus, and the like.

An embodiment of this application further provides a computer-readable storage medium. The computer-readable storage medium is configured to store a computer program or instructions. When the computer program or the instructions are executed by a computer, the computer can implement the communication method provided in the foregoing method embodiments.

An embodiment of this application further provides a computer program product. The computer program product is configured to store a computer program. When the computer program is executed by a computer, the computer can implement the communication method provided in the foregoing method embodiments.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the other programmable device, so that computer-implemented processing is generated. Therefore, the instructions executed by the computer or the other programmable device provide steps for implementing a specific function in one or more procedures in the flowcharts and/or in one or more blocks in the block diagrams.

It is clear that a person skilled in the art can make various modifications and variations to this application without departing from the protection scope of this application. This application is intended to cover these modifications and variations of this application provided that they fall within the scope of the claims of this application and equivalent technologies thereof.

What is claimed is:

1. A service transmission method, comprising:
obtaining a channel through contention, by a non-highest-priority service queue of a communication apparatus, and obtaining, by the non-highest-priority service queue, a transmission opportunity; and
when there is to-be-transmitted data in a highest-priority service queue, interrupting, by the communication apparatus, a data transmission process of the non-highest-priority service queue, and transmitting, by the communication apparatus, data of the highest-priority service queue in a time window corresponding to the transmission opportunity;
wherein interrupting the data transmission of the non-highest-priority service queue, and transmitting the data of the highest-priority service queue comprises;
interrupting a process of sending a physical layer protocol data unit (PPDU) data frame of the non-highest-priority service queue, when the communication apparatus is in a phase of sending the PPDU data frame of the non-highest-priority service queue, and adding a PPDU terminator at an interrupted position of the PPDU data frame, wherein the PPDU terminator indicates to end the data transmission process of the non-highest-priority service queue and to transmit the data of the highest-priority service queue.

2. The method according to claim 1, further comprising contending, by the non-highest-priority service queue, for another channel.

3. A service transmission method, comprising:
transmitting, by a communication apparatus, including a highest-priority service queue and a non-highest-priority service queue, data of the non-highest-priority service queue in a data transmission process of the non-highest-priority service queue, and when there is to-be-transmitted data in the highest-priority service queue, interrupting, by the communication apparatus, the data transmission process of the non-highest-priority service queue; and
transmitting, by the communication apparatus, the data of the highest-priority service queue;
wherein interrupting the data transmission of the non-highest-priority service queue, and transmitting the data of the highest-priority service queue comprises:
interrupting a process of sending a physical layer protocol data unit (PPDU) data frame of the non-highest-priority service queue, when the communication apparatus is in a phase of sending the PPDU data frame of the non-highest-priority service queue, and adding a PPDU terminator at an interrupted position of the PPDU data frame, wherein the PPDU terminator indicates to end the data transmission process of the non-highest-priority service queue and to transmit the data of the highest-priority service queue.

4. The method according to claim 3, wherein interrupting the data transmission of the non-highest-priority service queue, and transmitting the data of the highest-priority service queue further comprises:
adding the PPDU terminator to a tail of a PPDU control frame of the non-highest-priority service queue when the communication apparatus is in the phase of sending the PPDU control frame of the non-highest-priority service queue.

5. The method according to claim 3, wherein interrupting the data transmission of the non-highest-priority service queue, and transmitting the data of the highest-priority service queue further comprises:
sending, after receiving data of the non-highest-priority service queue, a PPDU control frame by the communication apparatus, when the communication apparatus is in a phase of receiving the data of the non-highest-priority service queue, and adding a PPDU terminator to a tail of the PPDU control frame.

6. The method according to claim 3, wherein interrupting the data transmission of the non-highest-priority service queue, and transmitting the data of the highest-priority service queue further comprises:
sending a PPDU null frame by the communication apparatus after receiving the data of the non-highest-priority service queue when the communication apparatus is in the phase of receiving the data of the non-highest-priority service queue, wherein the PPDU null frame comprises only a PPDU header and a PPDU terminator, and the PPDU null frame indicates to end the data transmission process of the non-highest-priority service queue and to transmit the data of the highest-priority service queue.

7. The method according to claim 3, wherein the PPDU terminator is an extremely high throughput-long training field EHT-LTF sequence obtained through 90-degree phase rotation.

8. A communication apparatus, comprising:
a memory comprising instructions; and
one or more processors in communication with the memory, wherein the one or more processors execute the instructions to:
perform communication transmission; and
contend for a channel by a non-highest-priority service queue, wherein the non-highest-priority service queue obtains the channel through contention, and the non-highest-priority service queue thereby obtains a transmission opportunity; and
when there is to-be-transmitted data in a highest-priority service queue of the communication apparatus, interrupting, by the first communication apparatus, a data transmission process of the non-highest-priority service queue, and control a transceiver to transmit data of the highest-priority service queue in a time window corresponding to the transmission opportunity;
wherein interrupting the data transmission of the non-highest-priority service queue, and transmitting the data of the highest-priority service queue comprises:
interrupting a process of sending a physical layer protocol data unit (PPDU) data frame of the non-highest-priority service queue, when the communication apparatus is in a phase of sending the PPDU data frame of the non-highest-priority service queue, and adding a PPDU terminator at an interrupted position of the PPDU data frame, wherein the PPDU terminator indicates to end the data transmission process of the non-highest-priority service queue and to transmit the data of the highest-priority service queue.

9. The communication apparatus according to claim 8, wherein the one or more processors execute the instructions to further have the non-highest-priority service queue contend for another channel.

10. A communication apparatus, comprising:
a memory comprising instructions; and
one or more processors in communication with the memory, wherein the one or more processors execute the instructions to:
interrupt a data transmission process of a non-highest-priority service queue in a process in which data of the non-highest-priority service queue is transmitted when there is to-be-transmitted data in a highest-priority service queue; and transmit the data of the highest-priority service queue;

wherein interrupting the data transmission of the non-highest-priority service queue, and transmitting the data of the highest-priority service queue comprises:

interrupting a process of sending a physical layer protocol data unit (PPDU) data frame of the non-highest-priority service queue, when the communication apparatus is in a phase of sending the PPDU data frame of the non-highest-priority service queue, and adding a PPDU terminator at an interrupted position of the PPDU data frame, wherein the PPDU terminator indicates to end the data transmission process of the non-highest-priority service queue and to transmit the data of the highest-priority service queue.

11. The communication apparatus according to claim 10, wherein interrupting the data transmission of the non-highest-priority service queue, and transmitting the data of the highest-priority service queue comprises:

adding the PPDU terminator to a tail of a PPDU control frame when the communication apparatus is in the phase of sending the PPDU control frame of the non-highest-priority service queue.

12. The communication apparatus according to claim 10, wherein interrupting the data transmission of the non-highest-priority service queue, and transmitting the data of the highest-priority service queue comprises:

sending a PPDU control frame when in the phase of receiving data of the non-highest-priority service queue, and after receiving the data, and adding a PPDU terminator to a tail of the PPDU control frame.

13. The communication apparatus according to claim 10, interrupting the data transmission of the non-highest-priority service queue, and transmitting the data of the highest-priority service queue comprises:

sending a PPDU null frame when in the phase of receiving data of the non-highest-priority service queue, and after receiving the data, wherein the PPDU null frame comprises only a PPDU header and a PPDU terminator, and the PPDU null frame indicates to end the data transmission process of the non-highest-priority service queue and transmit the data of the highest-priority service queue.

14. The communication apparatus according to claim 10, wherein the PPDU terminator is an extremely high throughput-long training field EHT-LTF sequence obtained through 90-degree phase rotation.

15. The method according to claim 1, wherein, after obtaining by the non-highest-priority service queue the channel through contention, only the highest-priority service queue contends for the channel, and the non-highest-priority service queue suspends channel contention.

16. The service transmission method of claim 3, wherein, after obtaining by the non-highest-priority service queue the channel through contention, only the highest-priority service queue contends for the channel, and the non-highest-priority service queue suspends channel contention.

17. The communications apparatus of claim 8, wherein when the one or more processors execute the instructions, after obtaining by the non-highest-priority service queue the channel through contention, only the highest-priority service queue contends for the channel, and the non-highest-priority service queue suspends channel contention.

18. The communications apparatus of claim 10, wherein when the one or more processors execute the instructions, after obtaining by the non-highest-priority service queue the channel through contention, only the highest-priority service queue contends for the channel, and the non-highest-priority service queue suspends channel contention.

* * * * *